United States Patent [19]

Matsui et al.

[11] 4,139,834
[45] Feb. 13, 1979

[54] ULTRASONIC WAVE TRANSMITTER/RECEIVER

[75] Inventors: Takeshi Matsui, Aichi; Matatoyo Hinachi, Nagoya, both of Japan

[73] Assignee: Nippon Soken, Inc., Nishio, Japan

[21] Appl. No.: 811,441

[22] Filed: Jun. 29, 1977

[30] Foreign Application Priority Data

Jul. 3, 1976 [JP] Japan .................. 51-79177

[51] Int. Cl.² .................. G01S 9/66; G01S 7/66
[52] U.S. Cl. .................. 340/1 R; 340/3 A
[58] Field of Search .................. 340/3 A, 3 R, 1 R; 310/314, 319

[56] References Cited

U.S. PATENT DOCUMENTS

| | | | |
|---|---|---|---|
| 3,102,991 | 9/1963 | Jess | 340/3 R |
| 3,117,241 | 1/1964 | Paynter et al. | 340/3 A |
| 3,559,158 | 1/1971 | Bettcher | 340/3 A |
| 3,613,068 | 10/1971 | Thompson et al. | 340/3 A |

Primary Examiner—Richard A. Farley
Attorney, Agent, or Firm—Cushman, Darby & Cushman

[57] ABSTRACT

An ultrasonic wave transmitter/receiver wherein an ultrasonic wave transducer is connected to a radiating ultrasonic wave carrier frequency oscillator through a switching means during transmission, while the ultrasonic wave transducer is connected to an operational amplifier and a band pass filter through the switching means during reception, comprises an impedance conversion circuit at an input of the operational amplifier to form a band pass amplifier of a low input impedance. By this arrangement, a receiving sensitivity near an antiresonance frequency of the transducer is reduced to lower the receiving sensitivity for noise, but without sacrificing an echo receiving sensitivity thereof, and a stable receiving operation is assured for possible change in a characteristic of the transducer.

2 Claims, 3 Drawing Figures

ULTRASONIC WAVE TRANSMITTER/RECEIVER

BACKGROUND OF THE INVENTION

Field of the Invention

The present invention relates to an ultrasonic wave transmitter/receiver for transmitting an ultrasonic pulse and receiving an echo pulse reflected from an object.

DESCRIPTION OF THE PRIOR ART

Figure 1:
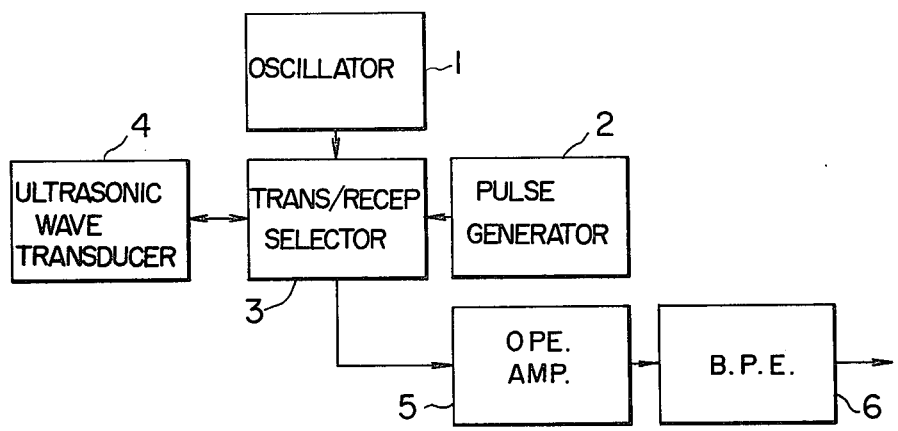
FIG. 1 is a block diagram illustrating a configuration of a prior art ultrasonic transmitter/receiver.
Figure 3:
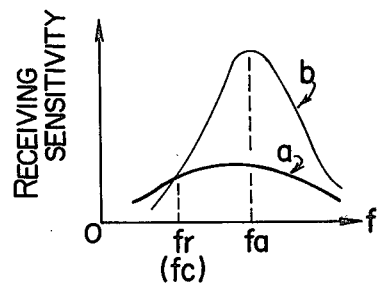
FIG. 3 shows a characteristic of a receiving sensitivity for transmission/reception frequency of an ultrasonic wave transducer used in the present invention.

A prior art ultrasonic wave transmitter/receiver, as shown in FIG. 1, comprises an oscillator 1 oscillating at a frequency equal to a carrier wave frequency of a radiating ultrasonic wave, a pulse generator 2 for generating transmission/reception selection signal, a transmission/reception selector 3 responsive to the transmission/reception selection signal, an ultrasonic wave transducer 4 for effecting transmission and reception of the ultrasonic wave pulse, an operational amplifier 5 and a band pass filter 6 connected to an output of the operational amplifier 5. The ultrasonic wave transducer 4 is connected to the oscillator 1 through the transmission/reception selector 3 during the radiation of the ultrasonic wave, which is connected to the operational amplifier 5 having a high input impedance during the receiving operation. A frequency characteristic of a receiving sensitivity exhibits a sharp peak near an antiresonance frequency $f_a$ of the ultrasonic wave transducer 4. As a result, the ultrasonic wave transducer 4 is sensitive to external noise components near the antiresonance frequency $f_a$ of the ultrasonic wave transducer 4, and the effect of the band pass filter 6 connected to the output of the operational amplifier 5 is not fully attained. Thus, the prior art apparatus has a drawback that the output signal thereof includes many noise components. Accordingly, accurate measurement of distance to an object is not achieved, and since the ultrasonic wave transducer 4 is heavily loaded during the reception, the characteristic of the ultrasonic transducer changes even by a few small water droplets attached to the ultrasonic wave transducer 4.

SUMMARY OF THE INVENTION

It is an object of the present invention to provide an ultrasonic wave transmitter/receiver which overcomes the drawbacks encountered in the prior art apparatus and which is insensitive to external noise and also insensitive to the deterioration of insulation of the ultrasonic wave transducer. The above object of the present invention is achieved by connecting the ultrasonic transducer to a band pass amplifier of a low input impedance including a load resistor and a coupling capacitor during the reception in order to lower the receiving sensitivity near the antiresonance frequency of the ultrasonic wave transducer.

DESCRIPTION OF THE PREFERRED EMBODIMENT

Figure 2:
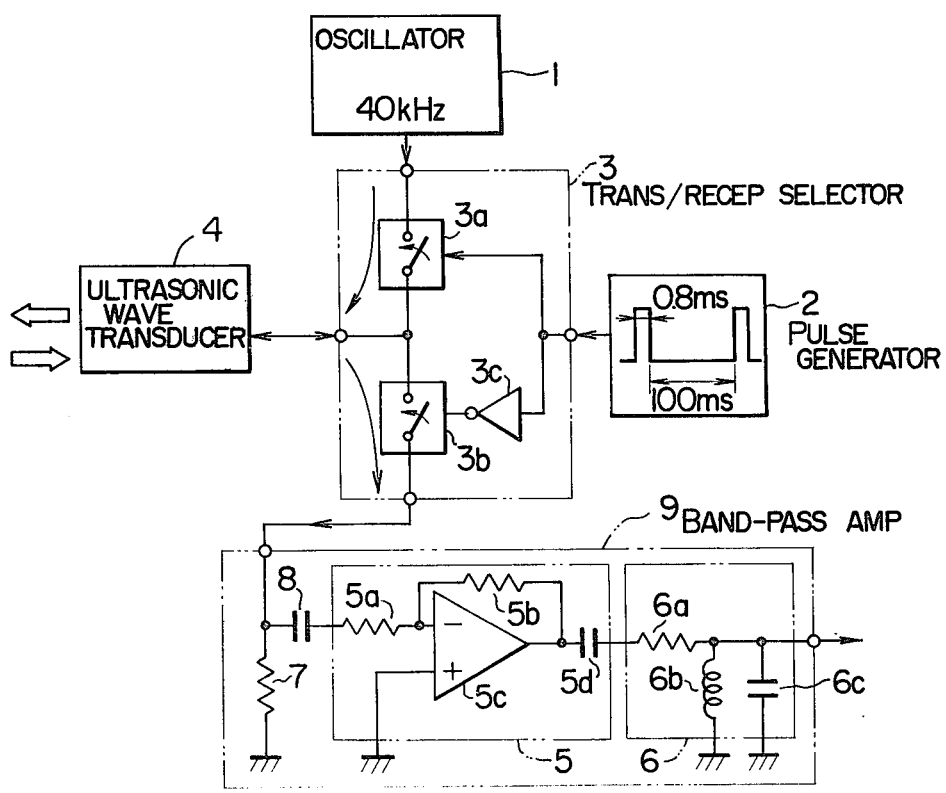
FIG. 2 is a block diagram illustrating one embodiment of an ultrasonic wave transmitter/receiver in accordance with the present invention.

The present invention will now be described in conjunction with a preferred embodiment thereof shown in FIG. 2. In FIG. 2, numeral 1 denotes an oscillator oscillating at a carrier frequency $f_c$, e.g. 40 KHz, of a radiating ultrasonic wave which frequency is equal to a resonance frequency (series resonance frequency) of an ultrasonic wave transducer 4, and numeral 2 denotes a pulse generator for generating a transmission/reception selection signal, which has "1" duration of 0.8 milli-seconds and "0" duration of 100 milli-seconds as shown. Numeral 3 denotes a transmission/reception selector which is responsive to the transmission/reception selection signal to connect the oscillator 1 to the ultrasonic wave transducer 4 during the transmission and connect the ultrasonic wave transducer 4 to a load resistor 7 and an operational amplifier 5 through a coupling capacitor 8 during reception. In the illustrated embodiment, the transmission/reception selector 3 comprises analog switches 3a and 3b and an inverter 3c. Each switch is closed when "1" level input thereto is received and open when "0" level input is received. As a result, the oscillator 1 is connected to the transducer 4 for the 0.8 milli-seconds time interval while the transducer 4 is connected to a band pass amplifier 9 to be described later for the 100 milli-seconds time interval. The operational amplifier 5 comprises an input resistor 5a, a feedback resistor 5b, an operational amplifier 5c and a capacitor 5d, which are arranged in a manner shown. Numeral 6 denotes a band pass filter having a center frequency equal to the carrier frequency $f_c$ of the ultrasonic wave and it comprises a resistor 6a, a coil 6b and a capacitor 6c. The load resistor 7, the coupling capacitor 8, the operational amplifier 5 and the band pass filter 6 constitutes the band pass amplifier 9 having a low input impedance.

The operation of the arrangement described above is now explained. The oscillator 1 is oscillating at the carrier frequency $f_c$ of the radiating ultrasonic wave which is equal to the resonance frequency (series resonance frequency) $f_r$ of the ultrasonic wave transducer 4, and it drives the ultrasonic transducer 4 through the transmission/reception selector 3 during the transmission. Namely, the transmission/reception selector 3 connects the oscillator 1 to the ultrasonic wave transducer 4 during the transmission by the transmission/reception selection signal generated by the pulse generator 2. The ultrasonic wave transducer, when driven by the oscillator 1, radiates the ultrasonic wave pulse in a given direction.

Upon the termination of the transmission of the ultrasonic wave pulse, the ultrasonic wave transducer 4 is disconnected from the oscillator 1 by the transmission/reception selector 3 and connected to the load resistor 7 and the operational amplifier 5 through the coupling capacitor 8. Thus, the reception operation starts.

On the other hand, the radiated ultrasonic wave pulse is reflected by the object and a portion thereof is reflected back to the ultrasonic wave transducer 4 as the echo pulse and received by the ultrasonic wave transducer 4 together with external noise. The transducer produces an output signal in response to the received echo pulse.

Since the ultrasonic wave transducer 4 is now connected in parallel with the load resistor 7 through the transmission/reception selector 3, a receiving sensitivity of the ultrasonic wave transducer 4 exhibits considerably low sensitivity near the antiresonance frequency (parallel resonance frequency) $f_a$ of the ultrasonic wave transducer 4 as shown by a curve $a$, in comparison with a curve $b$ which shows the receiving sensitivity under no load.

As a result, the receiving sensitivity for the noise components having frequencies near the antiresonance frequency is lowered by the amount corresponding to the reduction of the receiving sensitivity from the curve $b$ to the curve $a$, in comparison with that under no load. However, since the carrier frequency $f_c$ during the transmission is equal to the resonance frequency $f_r$ of the ultrasonic wave transducer 4 and hence the frequency of the received echo is equal to or close to the carrier frequency $f_c$ at the time of the transmission, the receiving sensitivity to the echo is not substantially lowered in comparison with that under no load. Thus, the output signal developed from the received echo which is received at a high S/N ratio is applied through the coupling capacitor 8 to the operational amplifier 5, where it is amplified and thence applied to the band pass filter 6. Since the center frequency of the band pass filter 6 is selected at the carrier frequency $f_c$ of the ultrasonic wave, the external noise components other than those near the received echo signal frequency are further attenuated and the band pass filter 6 finally produces stable received signals having small noise components. In this manner, exact measurement of distance to the object is performed using the output of the band pass filter 6.

While the load resistor 7 is arranged in the preceding stage of the coupling capacitor 8 in the illustrated embodiment, it may be connected in the succeeding stage of the capacitor 8 in parallel with the operational amplifier 5. Further, the operational amplifier 5 may be replaced by other appropriate amplifier with an input impedance thereof being suitably adjusted to exclude the load resistor 7.

Furthermore, the carrier frequency $f_c$ of the ultrasonic wave need not necessarily be coincident with the resonance frequency $f_r$ of the ultrasonic wave transducer 4 but it may be set to an appropriate frequency within a range which exhibits a small reduction of the receiving sensitivity to the received echo.

As described hereinabove, the ultrasonic wave transmitter/receiver of the present invention comprises the oscillator oscillating at the carrier frequency of the radiating ultrasonic wave, the ultrasonic transducer for transmitting and receiving the ultrasonic wave, and the band pass amplifier having the low input impedance for processing the output of the ultrasonic wave transducer whereby the receiving sensitivity near the parallel resonance frequency of the ultrasonic transducer is lowered. Accordingly, the receiving sensitivity to the noise components is lowered and the band of received noise components can be narrowed. Thus, the present transmitter/receiver is highly insensitive to external noise and assures stable reception operation even if the insulation resistance of the ultrasonic wave transducer is reduced by water droplets.

What is claimed is:

1. An ultrasonic wave transmitter/receiver comprising:
   an ultrasonic wave transducer for transmitting an ultrasonic wave having a carrier frequency equal to the resonant frequency thereof toward an object and receiving an echo wave reflected by said object, said transducer producing an output signal in response to the received echo wave;
   an oscillator circuit oscillating at said carrier frequency;
   a pulse generator circuit for generating a pulse signal having a constant frequency; and
   a selection circuit, connected to said pulse generator, for alternately connecting said transducer with said oscillator circuit and with a band-pass amplifier circuit in response to said pulse signal, said band-pass amplifier circuit including:
   a load resistor adapted to be connected in parallel with said transducer when the transducer is connected to said band-pass amplifier circuit by said selection circuit, said load resistor lowering the strength of said output signal at a frequency around the antiresonant frequency of said transducer during such parallel connection with the transducer.

2. An ultrasonic wave transmitter/receiver according to claim 1, wherein said load resistor is connected at an input stage of said band-pass amplifier and wherein said band-pass amplifier further comprises:
   a coupling capacitor connected to the load resistor for passing the output signal of lowered strength;
   an amplifier connected to said coupling capacitor for amplifying the output signal passed through said coupling capacitor; and
   a band-pass filter connected to an output of said amplifier, said filter having a band-pass frequency close to the carrier frequency of said ultrasonic wave.

* * * * *